United States Patent
Fenile (10) Patent No.: US 9,850,071 B2
(45) Date of Patent: Dec. 26, 2017

(54) ROLLER-GUIDED CONVEYING ELEMENT AND A CONVEYING FACILITY COMPRISING SUCH CONVEYING ELEMENTS

(71) Applicant: Ferag AG, Hinwill (CH)

(72) Inventor: Roberto Fenile, Wetzikon (CH)

(73) Assignee: FERAG AG, Hinwil (CH)

( * ) Notice: Subject to any disclaimer, the term of this patent is extended or adjusted under 35 U.S.C. 154(b) by 0 days.

(21) Appl. No.: 15/378,539

(22) Filed: Dec. 14, 2016

(65) Prior Publication Data

US 2017/0174435 A1 Jun. 22, 2017

(30) Foreign Application Priority Data

Dec. 16, 2015 (CH) ........................ 1845/15

(51) Int. Cl.
| | | |
|---|---|---|
| B65G 17/20 | (2006.01) | |
| B65G 47/74 | (2006.01) | |
| B65G 19/00 | (2006.01) | |
| B65G 19/02 | (2006.01) | |
| B65G 9/00 | (2006.01) | |

(52) U.S. Cl.
CPC ........... B65G 19/025 (2013.01); B65G 17/20 (2013.01); B65G 9/002 (2013.01)

(58) Field of Classification Search
None
See application file for complete search history.

(56) References Cited

U.S. PATENT DOCUMENTS

| | | |
|---|---|---|
| 5,819,906 A | 10/1998 | Enderlein et al. |
| 6,109,422 A | 8/2000 | Gossner |
| 6,588,579 B2 * | 7/2003 | Taeger ................... B65G 17/20 104/172.1 |
| 6,745,891 B2 * | 6/2004 | Walter ................ B61B 310/025 104/172.4 |
| 9,199,796 B2 * | 12/2015 | Fenile ..................... B65G 47/82 |
| 9,205,990 B2 * | 12/2015 | Otto ....................... B65G 17/20 |
| 2011/0214967 A1 | 9/2011 | Wend et al. |

(Continued)

FOREIGN PATENT DOCUMENTS

| | | |
|---|---|---|
| DE | 247498 | 5/1912 |
| DE | 1 013 047 | 8/1957 |
| DE | 295 19 284 | 1/1996 |

(Continued)

OTHER PUBLICATIONS

Switzerland Search Report dated Feb. 16, 2016, Application No. 01845/15.

*Primary Examiner* — Kavel Singh (74) *Attorney, Agent, or Firm* — Rankin, Hill & Clark LLP (57) ABSTRACT

A roller-guided conveying element for a conveying facility, including a basis body, several rollers that are rotatably mounted on the basis body on two sides which are opposed to one another, as well as a holding member that is arranged on the basis body and is for holding an object to be conveyed. In each case, two rollers are arranged oppositely and equally offset in a crosswise manner at the two sides on the basis body. The conveying element with the rollers is designed such that a section of the conveying element, in each case with at least one roller of the two sides of the basis body, is rollingly movable in the guide channel of a longitudinal guidance body.

15 Claims, 4 Drawing Sheets

(56) References Cited

U.S. PATENT DOCUMENTS

2014/0291124 A1\* 10/2014 Fenile .................. B65G 47/82
   198/617

FOREIGN PATENT DOCUMENTS

| | | |
|---|---|---|
| DE | 10 2010 010 107 | 9/2011 |
| EP | 0 856 480 | 8/1998 |
| EP | 1 690 811 | 8/2006 |
| FR | 2 458 213 | 1/1981 |
| WO | 99/33721 | 7/1999 |
| WO | 2011/060560 | 5/2011 |

\* cited by examiner

ROLLER-GUIDED CONVEYING ELEMENT AND A CONVEYING FACILITY COMPRISING SUCH CONVEYING ELEMENTS

BACKGROUND OF THE INVENTION

The invention lies in the field of transport and conveying technology, in particular of intra-logistics, and relates to a roller-guided conveying element for a conveying facility, in particular for a suspended-conveying facility. The conveying element includes a basis body, several rollers, which are rotatably mounted on the basis body, at two sides which lie opposed to one another, as well as a holding member for holding, in particular for the suspended holding of an object to be conveyed, the holding member being arranged on the basis body.

The invention moreover also relates to a conveying facility, in particular to a suspended-conveying facility with several such conveying elements, as well as a longitudinal guidance body that forms a guide channel, along which the conveying elements are rollingly movable for conveying, in particular for the suspended conveying of objects.

In automated warehouses, extensive production facilities and very generally with the conveying of goods, there exists the need to convey goods between processing stations, to intermediately store them in warehouses and to retrieve them again from the warehouses, as well as to prepare them for dispatch, by way of suspended-conveying devices.

Thus it is known from the state of the art, to convey objects such as clothes, but also conveying pockets receiving a conveyed article, in suspended-conveying devices by way of conveying elements which roll along a guide profile via rollers.

The published document EP 1 690 811 A1 thus, for example, describes a transport system for suspended objects, with a guide profile forming a guide channel, in which holding elements are displaceably guided by way of a roller pair. The holding elements are moved by bolt-like dogs of a driven driver chain.

The published document DE 10 2010 010 107 A1 describes a conveying facility for conveying and accumulating suspended objects with a driven driver chain, which is mounted on a guide profile and, below this, with conveying elements, which are mounted on rollers and on which objects are suspended as the conveyed goods. The conveying elements are transported in a conveying direction by the driver chain and when necessary are held up and accumulated by way of stop device. The drive of the conveying elements is effected by way of dogs, which are arranged on the underside of the driver chain and which engage on the basis body of the conveying elements.

Known conveying elements, also called holding elements in the state of the art, have the disadvantage that their guidance is quite unstable and the holding elements therefore tend to oscillate or wobble in the case of rapidly changing accelerations. This, amongst other things, is due to the fact that the rollers only form two contact locations to the guide profile and these contact locations moreover lie at the same height, considered in the conveying direction.

The known conveying elements as a result are particularly suitable for lightweight conveyed goods, such as clothes for example. The conveying elements, however, are not particularly suitable for conveying comparatively heavy objects. This is due to the fact that the contact of the guide rollers is insufficient for a stable guidance, as has already been mentioned. The high inertia forces of heavy conveyed goods, which inevitably occur during acceleration, can hardly be controlled at all due to this.

A control of the inertia forces arising with accelerations during the conveying, however, is an absolute requirement for the reliable operation of the conveying facility, particularly at comparatively high conveying speeds.

SUMMARY OF THE INVENTION

It is therefore the object of the present invention, to suggest a conveying element and a conveying facility, which permits a stable, reliable, quiet and trouble-free conveying, even of comparatively heavy conveyed goods.

The reliability and the safety of the conveying are yet also to be ensured at comparatively high conveying speeds.

Moreover, the conveying elements should also be able to be pushed onto one another, i.e. accumulated, in a compact manner, for the purpose of a space-saving intermediate storage.

The device according to the invention is now characterised in that in each case two rollers are arranged equally and oppositely offset on both sides of the basis body in a crosswise manner, and the conveying element with the rollers is designed such that a section of the conveying element, in each case with at least one roller of both sides of the basis body is rollingly movable in the guide channel of a longitudinal guidance body.

The rollers may also be named track rollers.

The conveying element therefore includes at least four rollers. The conveying element in particularly includes exactly four rollers.

The rollers are fastened to the basis body via axle stubs, for example. The rollers in particular are stuck or screwed onto the axle stubs.

The basis body as a result is arranged between the rollers attached at both sides.

The two rollers at a first side of the basis body in particular lie in a common first plane. The two rollers at the second side of the basis body in particular lie in a common second plane, which is spaced from the first plane and runs parallel to this. The basis body in particular is arranged between this first and second plane.

This permits the guiding of the rollers in the conveying direction, along running surfaces arranged at both sides of the basis body. The running surfaces can be formed by guide bars, as will yet be described in more detail further below.

The rollers of the conveying element in each case, in particular, are arranged mutually offset and distanced to one another, such that a first pairing of rollers rolls along running surfaces arranged in a first plane and a second pairing of rollers rolls along running surfaces arranged in a second plane. The first and the second plane are spaced from one another and run parallel to one another. A pairing of rollers is thereby formed in each case by a roller of both sides.

The basis body, with a section, in particular is guided in the conveying direction along a guide gap formed by a longitudinal guidance body. The guide gap in particular is formed between two guide bars, which, in particular, lie opposite one another. The guide bars form a running surface for rollers in each case. As a result, the basis body runs with a section through the guide gap. The guide gap, in particular, is slot-like.

The guide bars, which each form a running surface, are part of a longitudinal guidance body.

The rotation axes of the rollers in particular run parallel to one another.

The rollers in a parallel projection parallel to their rotation axes form an "X"-like arrangement. The rollers, which in each case are arranged on a common arm of the cross, are arranged on the same side of the basis body. The rollers arranged in each case on a common arm of the cross, in particular, lie in a common plane.

According to a further development, the two rollers on the respective side of the basis body in each case are arranged mutually offset and distanced to one another, in a manner such that a respective guide section of a guide bar has space between the rollers in each case.

According to a particular embodiment of this further development, the two rollers on the respective side of the basis body in each case are arranged mutually offset and distanced to one another, such that the guide sections of guide bars, which can be led through between the respective rollers pairs on both sides of the basis body, run parallel to one another.

The guide sections of guide bars, which can be led through between the respective roller pairs on both sides of the basis body, in particular lie in a common plane.

The basis body forms a middle longitudinal plane running parallel to the rotation axes of the rollers. The middle longitudinal plane, in particular, is aligned vertically in a freely suspended position of the conveying element.

The middle longitudinal plane, in particular, runs in each case between the rotation axes of two rollers arranged at one side of the basis body.

According to a further development, at least one roller now projects beyond the basis body, which is to say protrudes with respect to this, in a running direction of the conveying element.

The running direction corresponds to the possible movement direction of the conveying elements along a conveying track in the conveying facility. The running direction as a result corresponds to the conveying direction or a direction counter to the conveying direction. The running direction is parallel to the surface normal of the longitudinal middle plane.

According to a particular embodiment of this further development, all rollers project beyond the basis body, which is to say protrude with respect to this, in a running direction.

In particular, rollers project beyond the basis body in both running directions, which are opposite to one another.

According to a further development, the basis body forms a contact section at both sides, which lie opposed to one another and at which the rollers project beyond the basis body in the running direction. The contact section is arranged and designed such that a possible contact with a leading or trailing, equally designed conveying element is effected at least at the contact section.

Equally designed means that the basis body and/or the conveying elements have the same shape and dimension, which is to say geometry. Equally designed in particular means that the basis body and/or the conveying elements are constructionally identical.

The contact section at the mentioned sides of the basis body can be continuous or interrupted.

According to a further development, a possible contacting with a leading or trailing, equally designed conveying element is effected exclusively via the contact section.

According to a further development, the arrangement of the at least one roller on the basis body and the design of the basis body are such that the at least one roller overlaps with the adjacent conveying element which is to say its basis body, in the running direction, given a contact with a leading or trailing, equally designed conveying element at the contact section.

According to a particular embodiment of this further development, the arrangement of all rollers on the basis body and the design of the basis body are such that the rollers overlap with the adjacent conveying elements, which is to say with their basis bodies, in the running direction, given a contact with a leading or trailing, equally designed conveying element at the contact section.

According to a further development, at least one engagement section projecting beyond the basis body in the running direction is arranged on the basis body or is formed on the basis body.

The basis body with the engagement section, in particular, is designed such that the engagement section overlaps with the adjacent conveying element, which is to say with its basis body, in the running direction, given a contact with a leading or trailing, equally designed conveying element at the contact section.

According to a particular embodiment of this further development, the projecting engagement section at the same time is a fastening section for fastening a roller.

According to a particular embodiment of this further development, a fastening section, which at the same time is designed as an engagement section projecting beyond the basis body in the running direction, is arranged on the basis body in each case for each roller.

The engagement section or fastening section, for example, can be tab-like or lobe-like.

The rotation axis of the roller in particular is arranged in the region of the fastening section. If the rollers are fastened to the basis body via axle stubs, then the axle stubs in particular are arranged in the region of the fastening section.

According to a further development, at least one recess for receiving the engagement section of an adjacent, equally designed conveying element is arranged on the basis body. The engagement of the engagement section into the recess, in particular, is with an exact fit. The projecting fastening section and the recess are designed in an equal and opposite manner for this.

The engagement section engages into the recess in an overlapping manner.

According to a particular embodiment of this further development, at least one recess for receiving in each case a fastening section designed as an engagement section, of a roller of an adjacent, equally designed conveying element, is formed on the basis body.

The basis body includes a number of recesses, which corresponds to the number of engagement sections.

The recess, in particular, in the running direction is arranged offset with respect to a projecting engagement section arranged on the same basis body.

As a result of this, the basis bodies of two adjacent conveying elements, which contact at the contact location, overlap at the location of the engagement of the engagement section into the recess.

The engagement of a fastening section formed as an engagement section, into the recess of an adjacent, equally designed conveying element moreover permits the overlapping arrangement of the related roller with the adjacent conveying element, which is to say with its basis body.

According to a further development, the at least one recess and the at least one engagement section are designed such that two adjacent, equally designed conveying elements, which contact at the contact section, are secured against a displacement relative to one another, perpendicularly to the running direction and perpendicularly to the rotation axes of the rollers, by way of the engagement of the fastening section into the recess of the adjacent conveying element.

The at least one recess and the at least one fastening section thus form a positive connection in this context.

This means that two adjacent, equally designed conveying elements which contact at the contact section, in a suspended position are secured against a vertical displacement relative to one another.

The securing against a vertical displacement relative to one another means that weight forces can be transmitted between adjacent conveying elements. This permits a load levelling between the conveying elements, in a rowed, which is to say accumulated, stowage formation.

On account of this, a balanced or equalised weight loading prevails within a rowed formation of conveying elements, which bear compactly on one another and in particular contact at the contact locations, by which means the individual conveying carriages are treated gently.

Such a positive-fit interconnection of the conveying elements in a manner secured against mutual vertical displacement also improves the movement of the conveying elements in grouped formation.

The design of the basis body and the arrangement of the rollers on the basis body of the conveying element are moreover of such a nature that several conveying elements, which are rowed on one another and which contact via the contact sections, in a suspended position in each case form an upper row and a lower row of successively arranged rollers in each case.

The holding member on the conveying element can be designed in a practically arbitrary manner. The holding member, however, includes a through-opening for hanging in a bow or coat hanger, a pocket, a bag or generally a hook.

The holding member can, however, also be designed for the clamped holding. Other holding mechanisms, which function, for example, by way of magnetic forces, adhesive bond, non-positive or positive connections, etc., are likewise possible.

The holding member can be an integral constituent of the basis body. The holding member can also be a body that is connectable to the basis body.

The holding member, in particular, is arranged below the rollers in a freely suspended position of the conveying element.

According to a further development, the conveying element includes a dog contact element, which is arranged on the basis body, for creating a driving contact (catching contact) with a dog. The dog contact element, for example, can be a pin, a lug or a tongue. The dog contact element can be an integral part of the basis body.

The dog contact element, in particular, is arranged above the rollers, in a freely suspended position of the conveying elements.

According to a further development, an electronically or optically readable identification element is arranged on the basis body.

The identification element, for example, can be a data memory element, such as RFID transponder, or a bar code or matrix code. The identification element can be attached onto the basis body or integrated into this.

The identification element, for example, serves for storing identification information concerning the conveying element or the conveyed good, which is conveyed by this. Moreover, information concerning the conveying path, which has been covered or which is to be covered, can also be stored in the identification element, which is designed as a data memory element.

The basis body is designed as a flat body. This means that its length and width are significantly greater than its height. The basis body is an elongate body. This means that its length is significantly larger than its width. The rotation axes of the rollers are aligned transversely to the longitudinal or width extension and parallel to the height extension, of the basis body.

The basis body can be of metal or plastic. The basis body can be manufactured by way of injection moulding, for example. The basis body, for example, can be manufactured of a single part. Thereby, one or several of the following elements, as already mentioned above to some extent, can already be integrated into the single-part basis body on manufacture:
holding member;
dog contact element;
engagement or fastening section;
recess;
axle stub.

A side guidance roller is arranged on the basis body according to a further development. The rotation axis of the side guidance roller, in particular, is aligned perpendicularly to the rotation axes of the rollers. The side guidance roller serves for the lateral guidance of the conveying element transversely to the running direction along a longitudinal guidance body.

The side guidance rollers serve for the rolling of the conveying element on lateral guide surfaces on the longitudinal guidance body. The guide surfaces can be formed by face sides of guide bars forming the running surfaces.

The invention moreover relates to a conveying facility, in particular to a suspended-conveying facility, with several of the conveying elements according to the invention and which have been described above, for conveying objects along a conveying track. The conveying facility includes a longitudinal guidance body forming a guide channel, along which the conveying elements are rollingly movable.

The roller-guided conveying element can also be called a conveying carriage or carrier.

The longitudinal guidance body with a suspended conveying is arranged above the holding member of the conveying element.

The longitudinal guidance body has an open hollow profile with a profile cavity forming the guide channel. The running surfaces for at least two, in particular for all rollers of the conveying element, are formed in the profile cavity.

The longitudinal guidance body includes a guide gap. The guide gap, which has already been described above, separates an outer-lying section of the basis body with the holding member from a section of the basis body with rollers, the latter-mentioned section lying in the guide channel.

The longitudinal guidance body with regard to cross section can be designed in a single-part, or multi-part, in particular two-part manner. The longitudinal guidance body can thus be manufactured, for example, from two joined-together half-shells.

The longitudinal guidance body can be an extrusion profile. The longitudinal guidance body can be a rolled profile.

As already mentioned, a section of the conveying element, with at least one roller of in each case one side of the basis body can be rollingly movably arranged in the guide channel of the longitudinal guidance body.

According to a further development of the invention, a section of the conveying element, with all rollers is rollingly movably arranged in the guide channel of the longitudinal guidance body.

The conveying element is designed as an inner-runner. An inner-runner is characterised in that the running surfaces for the rollers of the conveying element are arranged or formed in the guide channel. This means that the conveying element rolls with its rollers in the guide channel.

The longitudinal guidance body or its profile cavity in particular in total forms four running surfaces for the rollers.

The longitudinal guidance body includes at least two guide bars, which lie opposite one another and which form the intermediately lying guide gap, through which the basis body extends. Such an arrangement has already been described further above. The guide bars in particular form a running surface in each case.

According to further development, the longitudinal guidance body includes two guide bars, which in each case at an upper and lower side form a running surface in the profile cavity. The guide bars in the profile cavity thus in total form four running surfaces for the four rollers.

According to another further development, the longitudinal guidance body includes four guide bars, which in the profile cavity in each case form one, and in total four running surfaces for the four rollers.

A roller of the guide element in each case rolls on each guide bar, given a movement of the guide element in the conveying direction.

According to a further development, the conveying facility includes a driver device with a plurality of dogs, which cooperate with dog contact elements on the conveying elements, for driving the conveying elements.

The dogs are arranged on a driver element of the driver device. The driver element and, with this, the dogs are driven accordingly.

The driver element is a flexible elongate body such as a chain, belt or strap. The dogs can be pins, lugs or lobes. The dogs can also be part of the flexible elongate body itself and be formed, for example, by way of the particular geometry of the longitudinal body.

The driver device can also include a brush drive with bristles, which are moved in the conveying direction and which form a driving contact with the conveying elements. The bristles can be arranged on a driver element. Separate dog contact elements on the conveying elements under certain circumstances are not necessary with this embodiment variant.

The driver element can be guided in the running direction of the conveying element, in a longitudinal channel of the longitudinal guidance body. The guidance can, e.g., be a sliding guidance.

The conveying facility can moreover also be designed as a gravity conveyor. Here, the conveying elements are driven in a manner assisted by gravity.

The movement of the conveying elements in particular is effected along the longitudinal guidance body. This forms the conveying track.

The conveying elements are movable independently of one another. This means that the conveying elements are not directly or indirectly, mechanically coupled to one another in a permanent manner, during their movement along the conveying path.

A guidance of the conveying elements in the guide channel and which is secured against tilting in the conveying direction is achieved thanks to the crosswise, equally and oppositely offset arrangement of two rollers in each case. This means that the conveying vehicle or carriage, in a suspended position, can no longer be deflected to the front or to the rear in the conveying direction, which is to say tilted, even on acceleration.

An oscillation or wobbling of the conveying elements or of the objects, which are suspended thereon, in the case of changing accelerations is prevented by way of this.

No additional mechanical stabilisation measures, which have the purpose of bringing the conveying elements into a stable position or alignment in the running direction, are needed since the conveying elements are stabilised in the conveying direction, which is to say running direction, by way of the roller arrangement according to the invention.

Drive chains, which are simpler with regard to the design and are accordingly less expensive, can be applied due forgoing such stabilising means, which as a rule are provided on the drive chain.

The conveying element can moreover accommodate greater carrying loads due to the more stable guidance. The conveying element according to the invention thus permits carrying loads of up to 10 kg. Previous conveying elements, as have been described, for example, as the state of the art in the introductory part of the description, in contrast are only designed for weight loads of up to 3 kg.

The roller arrangement according to the invention also permits an increase of the contact points on the guide profile. For example, once can envisage the carrying load, also called contact load or weight load, being uniformly distributed onto all four rollers by way of a suitable roller guidance.

This is also of significance with regard to the intermediate storage, with which there exists the danger of the resting, but loaded rollers flattening over the course of time, which leads to a non-smooth running of the rollers and consequently of the conveying element, given a conveying at a later stage.

The operational reliability is also ensured with suspended-conveying facilities, with which the longitudinal guidance body is arranged at head height, due to the fact that the rollers of the conveying element designed as an inner-runner and guided in the guide channel of the longitudinal guidance body is encased by the longitudinal guidance body. The rollers are also better protected from fouling and from undesirable external influences in this manner.

The particular design of the conveying element, which permits an overlapping at least of the rollers with the basis body of an adjacent, equally designed conveying element, apart from the optional mutual, vertical securing, also permits a compact and space-saving rowing of the conveying elements onto one another in the running direction, which is to say conveying direction.

A space-saving rowing together of the conveying elements is of particular significance in storage spaces, in which conveying elements with the objects suspended on these are to be intermediately stored before onward conveying.

A space-saving rowing of the conveying elements onto one another is also important in empty storage spaces, in which empty conveying elements are intermediately stored until their provision.

The inventive arrangement of several rollers on the basis body, the rollers being connected to the running surfaces on different planes, also opens up new possibilities with regard to the design of diverters (points) and to the leading of the conveying elements via diverters for the purpose of moving the conveying elements along different conveying paths.

A reliable and stable guidance of the conveying elements is also possible over diverters, where it is no longer the case that all rollers of the conveying element contribute to the support or stabilisation, on account of the fact that according to the invention, two rollers always run on running surfaces lying in a common plane.

BRIEF DESCRIPTION OF THE DRAWINGS

The subject-matter of the invention is hereinafter explained in more detail by way of embodiment, examples which are represented in the accompanying figures. In each case in a schematic manner are represented in:

FIG. 1b a lateral view of the conveying element according to FIG. 1a;

DETAILED DESCRIPTION OF THE INVENTION

The conveying element 1, 1' according to the FIGS. 1a to 1c and 7 includes an elongate basis body 2, 2', which is aligned vertically in the freely suspended position. Accordingly, the middle longitudinal plane E, which runs in the longitudinal direction of the basis body 2'2' and parallel to the rotation axes D of the rollers 3a-3d, is also aligned vertically.

Four rollers 3a-3d are arranged on the basis body 2, 2', wherein in each case two rollers 3a, 3b; 3c, 3d are arranged equally and oppositely offset on both sides of the basis body 2, 2' in a crosswise manner.

In the freely hanging position of the conveying element 1, 1', the rollers 3a-3d are arranged in an X-shaped manner in a parallel projection parallel to the rotation axes D. This means that the rollers 3a, 3b; 3c, 3d are arranged in each case in a paired manner along the crossing arms of a diagonal or cross.

A holding member 4 in the form of a holding eyelet, into which the hook of a coat hanger or a pocket can be hung, is formed on the basis body 2, 2'. The holding member 4 is arranged below the rollers 3a-3d in the freely hanging position of the conveying element 1, 1'.

A pin-like dog contact element 5 is moreover formed on the basis body 2, 2'. The dog contact element 5 is arranged above the rollers 3a-3d in the freely hanging position of the conveying element 1, 1'.

The rollers 3a-3d are fastened on the basis body 2, 2' via fastening sections 7a-7d. For this, axle stubs, onto which the rollers 3a-3d can be stuck or screwed, are arranged on the basis body 2, 2'.

The fastening sections 7a-7d and with these, also the rollers 3a-3d fastened thereto, project beyond the basis body 2, 2' which is to say protrude with respect to this, in a running direction V parallel to the surface normal of the longitudinal middle plane E.

The basis body 2, 2' forms contact sections 6 at those two sides, at which the rollers 3a-3d project beyond the basis body 2, 2' in the running direction V, and these contact sections are arranged and designed such that a contact with a leading or trailing, equally designed conveying element 1, 1' is effected via the contact sections 6.

The fastening sections 7a-7d, which project beyond the basis body 2, 2' in the mentioned manner, are designed in a semicircular manner in the present embodiment example. However, they can also have any other shape.

Recesses 8a-8d for the exactly fitting receiving of a projecting fastening section 7a-7d of an adjacent, equally designed conveying element 1, 1' in each case are moreover arranged on the basis body 2, 2'.

The recesses 8a-8d are designed semicircularly in the present embodiment example. However, they can also have a different shape.

The recesses 8a-8d are moreover arranged on the basis body 2, 2', in each case in a manner offset with respect to a projecting fastening section 7a-7d on the same basis body 2, 2'. The contours of the recesses 8a-8d and of the corresponding fastening sections 7a-7d with this arrangement complement one another into a full circle in each case.

The semi-circular geometry of the recess 8a-8d and the fastening section 7a-7d permit the vertical self-centering of conveying elements 1, 1', which are pushed together in the hanging position.

If now two conveying elements 1, 1' are pushed together in the running direction V, to the extent that these contact one another via the contact sections 6, then the fastening sections 7a-7d in each case come into an engagement with the recesses 8a-8d of adjacent conveying elements, which are assigned to these fastening sections. The fastening sections 7a-7d therefore also have the function of engagement sections.

Figure 2:
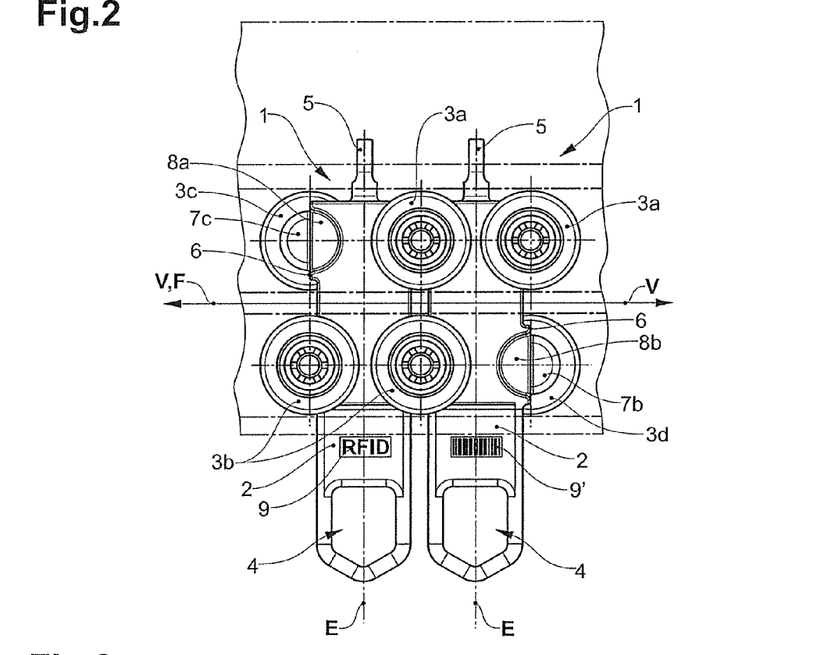
FIG. 2 a lateral view of two conveying elements according to FIGS. 1a-c, which are successively rowed on one another in the overlapping position, FIG. 3 a lateral view of a detail of a conveying facility with two conveying elements in the overlapping position according to FIG. 2.

The basis body 2, 2' of two adjacent conveying elements 1, 1', which contact at their contact sections, as a result of this overlap at the location of the engagement of the fastening section 7a, 7d into the recess 8a-8d. The rollers 3a-3d also simultaneously overlap with the basis body 2, 2 of the adjacent conveying elements 1, 1' (see also FIG. 2).

The conveying elements 1, 1' in their suspended position are secured with regard to a vertical displacement relative to one another, by way of the engagement of the fastening sections 7a-7d into the recesses 8a-8d. The bringing-together of the fastening section 7a-7d and recess 8a-8d leads to a positive fit with regard to a vertical displacement.

Figure 1A:
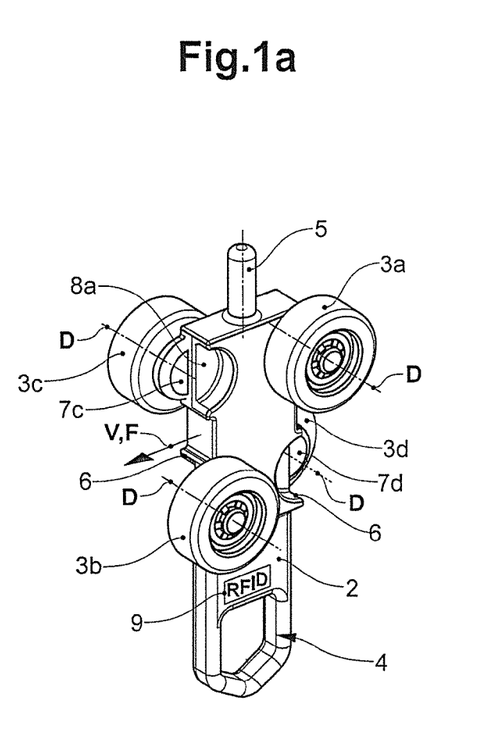
FIG. 1a a perspective view of a conveying element according to the invention.
Figure 1B:
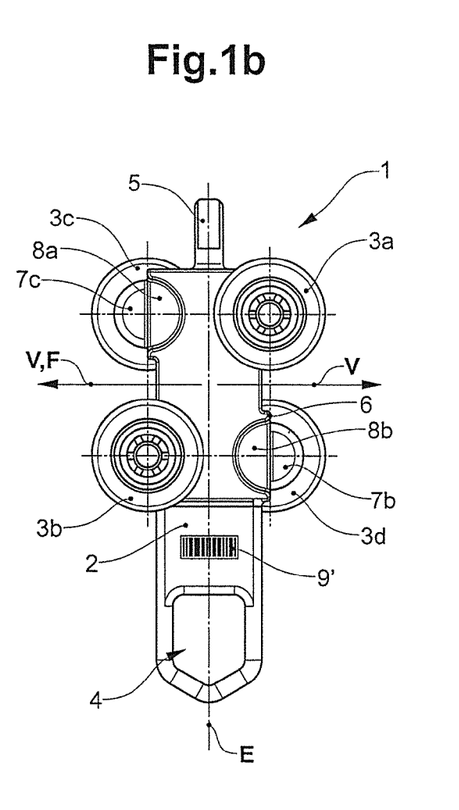
Figure 1C:
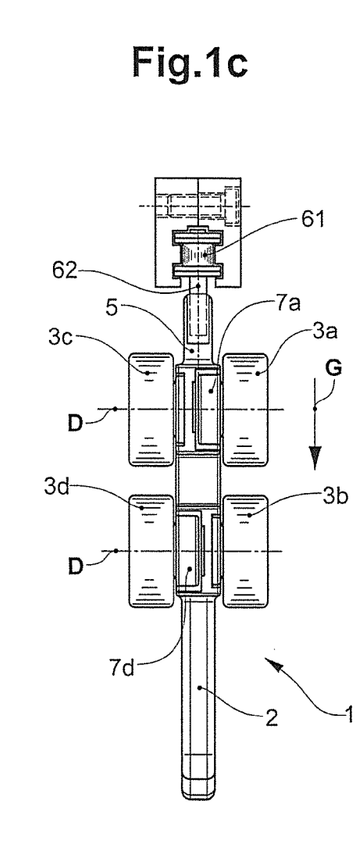
FIG. 1c a front view of the conveying element according to FIGS. 1a and 1b.

An identification element 9, 9', which according to FIG. 1a is present as an RFID transponder 9 and according to FIG. 1b is present as a bar code 9', is arranged on the basis body 2, according to the FIGS. 1a to 1c.

Figure 7:
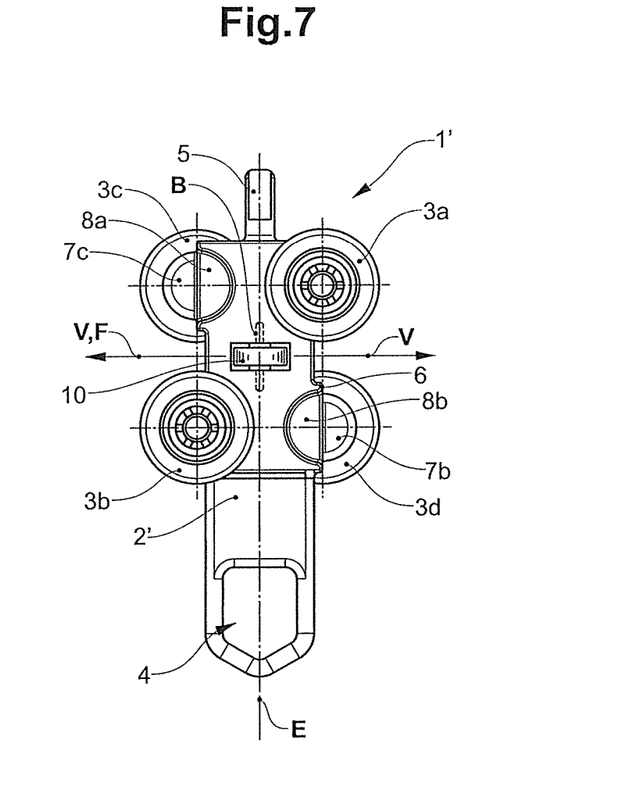
FIG. 7 a lateral view of a further embodiment of a conveying element according to the invention.

The further embodiment of a conveying element 1' according to FIG. 7 differs from the embodiment according to FIG. 1a-1c by side guidance rollers 10. The side guidance rollers 10 are rotatably mounted about the rotation axis B in a recess in the basis body 2'. The rotation axis B is aligned perpendicularly to the rotation axes D of the rollers 3a-3d and runs parallel to the middle longitudinal plane E.

The side guidance rollers 10 roll on a guide surface on the longitudinal guidance body, in a lateral manner relative to the running direction V and thus stabilise the conveying element to the side. The guide surface according to the present embodiment is formed by the face sides of guide bars forming the running surfaces.

The associated conveying facility for driving the conveying elements 1 now includes a driver device with a driver element designed as a driver chain 61. A plurality of dogs 62, which project in the direction of the conveying element 1, are arranged on the driver chain 61 (see FIG. 3).

Figure 3:
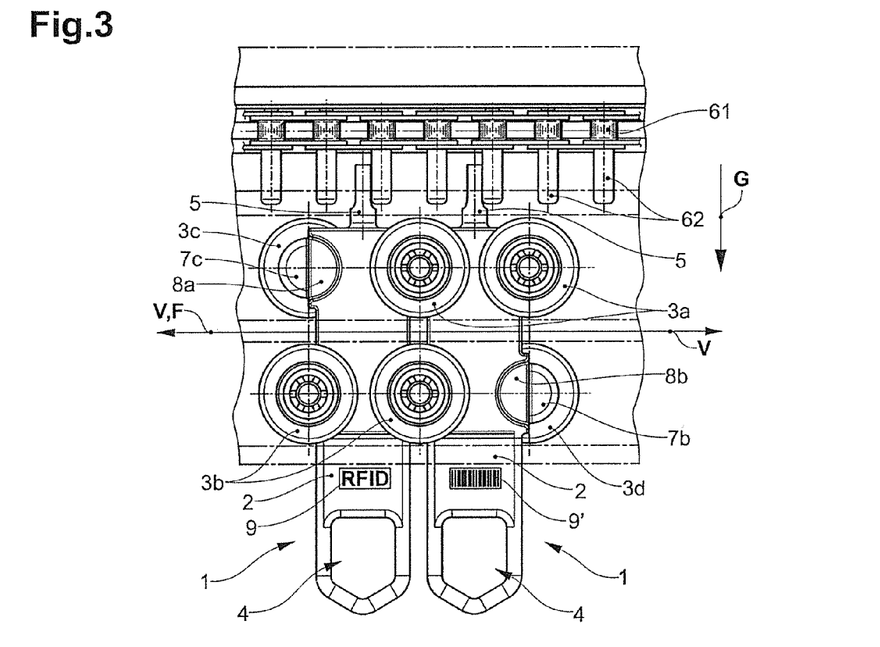

The dog contact elements 5 of the conveying elements 1, in the drive position now engage between the dogs 62 of the driver chain 61. The dogs 62 are now likewise moved in the conveying direction F on account of the driver chain 61 moving in the conveying direction F and forcibly come into driving contact with the dog contact elements 5.

The conveying elements 1 are likewise moved in the conveying direction F via the driving contact due to the continued movement of the dogs 62 in the conveying direction F.

The conveying element 1 is designed as a so-called inner runner. This means that the rollers 7a-7d roll on running surfaces in the inside of the guide channel 52, 152, 252 of a longitudinal guidance body designed as a hollow profile body 51, 151, 251 (see FIGS. 4 to 6).

Figure 4:
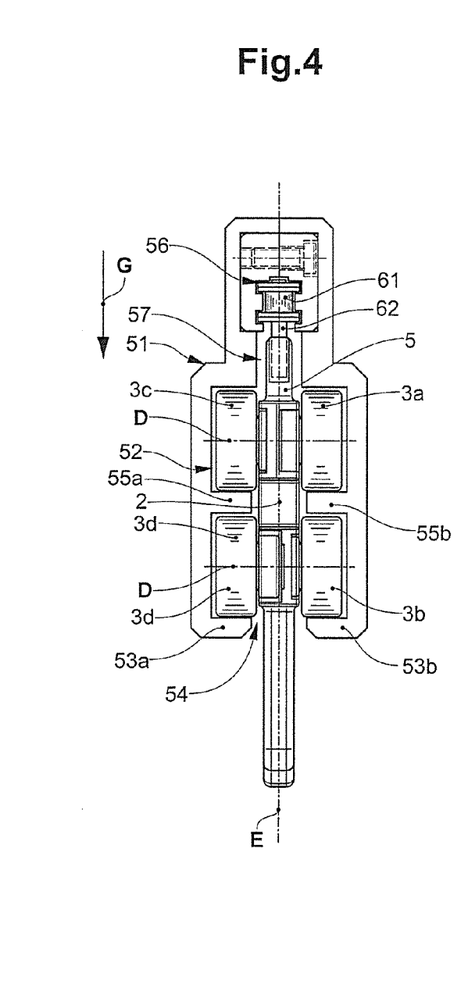
FIG. 4 a front view of a detail of a conveying facility with a guide profile according to a first embodiment and with a conveying element according to FIG. 1 to 2.
Figure 5:
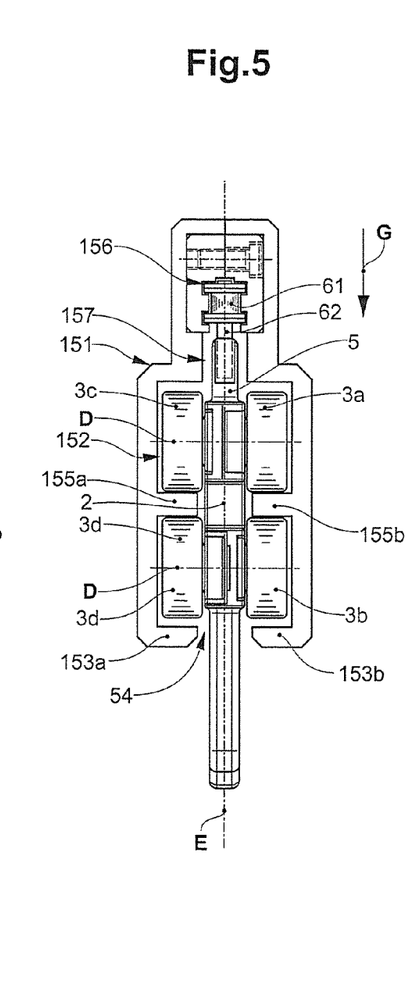
FIG. 5 a front view of a detail of a conveying facility with a guide profile according to a second embodiment and with a conveying element according to FIG. 1a-1c.
Figure 6:
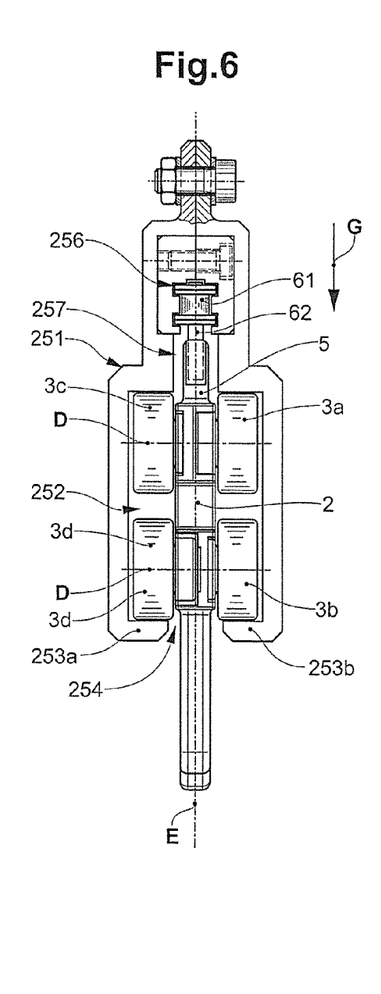
FIG. 6 a front view of a detail of a conveying facility with a guide profile according to a third embodiment and with a conveying element according to FIG. 1a-1c.

The hollow profile body 51, 151, 251 is designed as an open hollow profile and includes a slot-like guide gap 54, 154, 254, which runs along the running direction V.

The slot-like guide gap 54, 154, 254 is delimited, which is to say formed by two guide bars 53a, 53b; 153a, 153b; 253a, 253b of the hollow profile body 51, 151, 251, which lie opposite and parallel to another.

The basis body 2 runs through the mentioned slot-like guide gap 54, 154, 254, which separates an outer-lying section of the basis body 2 with the holding member 4 from an inner-lying section of the basis body 2 with the rollers 7a-7d.

The guide profiles 51, 151, 251 according to the embodiments shown in FIGS. 4 to 6 include a first guide channel 52, 152, 252 for guiding the rollers 7a-7d of the conveying element 1, as well as a second guide channel 56, 156, 256, which is arranged above the first guide channel 52, 152, 252 with respect to the gravitational direction G and is for guiding a driver chain 61. The two guide channels 52, 152, 252; 56, 156, 256 are connected to one another via a slot-like connection channel 57, 157, 257. The dog contact elements 5 of the basis body 2, as well as the dogs 62 of the driver chain 61 engage into the connection channel 57, 157, 257, so that the driving contact is formed in the connection channel 57 157, 257, The guide bars 53a, 53b; 153a, 153b; 253a, 253b, which form the slot-like guide gap 54, 154, 254, according to the two embodiments according to FIGS. 4 and 6, in the guide channel 52, 152, 252 form a running surface for the rollers 3b, 3d, which are at the bottom in the gravitational direction.

The guide profile 51, 151 according to the two embodiments according to FIGS. 4 and 5, above the guide bars 53a, 53b; 153a, 153b forming the guide gap 51, 154 now includes two further second guide bars 55a, 55b; 155a, 155b, which project into the guide channel 52, 152, lie opposite one another and run parallel to one another.

The second guide bars 55a, 55b; 155a, 155b are therefore arranged in the guide channel 52, 152 such that the upper rollers 3a, 3c are led past above the second guide bars 55a, 55b; 155a, 155b, and second lower rollers 3b, 3d below these.

Accordingly, both rollers 3a-3d in each case are arranged mutually offset and spaced from one another on the respective sides of the basis body 2, such that the second guide bars 55a, 55b; 155a, 155b lead through between the respective roller pairings 3a, 3b; 3c, 3d at the respective side of the basis body 2.

According to the embodiment according to FIG. 4, the first and second guide bars 53a, 53b; 55a, 55b as well as the rollers 3a-3d are arranged such that the lower rollers 3b, 3d in the guide channel 52 lie on the first guide bars 53a, 53b and roll along running surfaces formed by these, and the upper rollers 3a, 3c in the guide channel 52 lie on the second guide bars 55a, 55b and roll along running surfaces formed by these. Accordingly, the upper rollers 3a, 3c rotate in the same direction as the lower rollers 3b, 3d.

According to the embodiment according to FIG. 5, the second guide bars 155a, 155b as well as the rollers 3a-3d are arranged such that the lower rollers 3b, 3d bear from below on the second guide bars 155a, 155b and roll along lower running surfaces formed by these, and the upper rollers 3a, 3c lie on the second guide bars 155a, 155b and roll along upper running surfaces formed by these. The upper and the lower running surface are arranged opposed to one another. Accordingly, the upper rollers 3a, 3c rotate in the opposite direction compared to the lower rollers 3b, 3d.

According to the embodiment according to FIG. 6, the guide profile has no second guide bars projecting into the profile cavity, as is the cases in FIGS. 4 and 5. Here, the guide profile 251 as well as the rollers 3a-3d in contrast are designed and arranged such that the lower rollers 3b, 3d in the guide channel 52 lie on the first guide bars 53a, 53b and roll along running surfaces formed by these, and the upper rollers 3a, 3c bear on upper profile walls and roll along upper running surfaces, which are formed by these. The upper and lower running surface are arranged opposed to one another. Accordingly, the upper rollers 3a, 3c rotate in the opposite direction compared to the lower rollers 3b, 3d.

The guide profiles 51, 151, 251 according to FIGS. 4 to 6 can also be applied in the conveying facility in combination. Thus, for example, a change from one guide profile 51, 151, 251 to the other can be envisaged in the region of a diverter.

The invention claimed is:

1. A roller-guided conveying element for a conveying facility, comprising a basis body, several rollers that are rotatably mounted on the basis body at two sides, which face in opposite directions, and the basis body is arranged between the rollers attached at both sides, further comprising a holding member that is arranged on the basis body and is for holding an object to be conveyed,
   wherein, in each case, two rollers are arranged oppositely and equally offset in a crosswise manner on the two sides on the basis body, and the conveying element with the rollers is designed such that a section of the conveying element, in each case with at least one roller of the two sides of the basis body, is rollingly movable within a guide channel formed by a cavity of a longitudinal hollow guidance body.

2. The conveying element according to claim 1, further comprising a dog contact element arranged on the basis body, for creating a driving contact with a dog of a driver device.

3. The conveying element according to claim 1, wherein at least one roller projects beyond the basis body in a running direction.

4. The conveying element according to claim 3, wherein the basis body forms a contact section at that side, at which the at least one roller projects beyond the basis body, so that a possible contact with a leading or trailing, equally designed conveying element is effected at least at the contact section.

5. The conveying element according to claim 3, wherein the at least one roller overlaps with the adjacent conveying element in the running direction, given a contact with a leading or trailing, equally designed conveying element at the contact section.

6. The conveying element according to claim 3, wherein at least one engagement section for a roller is arranged on the basis body, said engagement section projecting beyond the basis body in the running direction.

7. The conveying element according to claim 6, wherein at least one recess for receiving an engagement section of an adjacent, equally designed conveying element is arranged on the basis body.

8. The conveying element according to claim 6, wherein the at least one recess and the at least one engagement section are designed such that two adjacent, equally designed conveying elements contacting at the contact section are secured against a displacement perpendicular to the running direction and perpendicular to the rotation axes of the rollers.

9. The conveying element according to claim 6, wherein the conveying element comprises a plurality of recesses and a plurality of engagement sections or fastening sections for a roller in each case, in particular for the overlapping arrangement of the rollers between adjacent, equally designed guide elements.

10. The conveying element according to claim 1, wherein a side guidance roller with a rotation axis aligned perpendicularly to the rotation axes of the rollers is arranged on the basis body, for lateral guidance of the conveying element transversely to the running direction along a longitudinal guidance body.

11. A conveying facility, in particular a suspended-conveying facility, with several conveying elements according to claim 1, for conveying objects, and with a longitudinal hollow guidance body with a cavity forming a guide channel, along which guide channel the conveying elements are rollingly movable.

12. The conveying facility according to claim 11, wherein the longitudinal guidance body comprises a guide gap, through which the basis body extends.

13. The conveying facility according to claim 11, wherein the basis body of the conveying elements extends through the guide gap, wherein a first section of the basis body which receives the holding member is located outside the guide channel and a second section of the basis body, which receives at least two rollers, is located within the guide channel.

14. The conveying facility according to claim 11, further comprising a driver device with a plurality of dogs that cooperate with dog contact elements on the conveying elements, for driving the conveying elements.

15. The conveying facility according to claim 11, wherein the conveying elements are movable independently of one another.

* * * * *